United States Patent [19]
Carrick

[11] Patent Number: 5,154,240
[45] Date of Patent: Oct. 13, 1992

[54] FOLDING IMPLEMENT FRAME

[75] Inventor: Lawrence K. Carrick, Spokane, Wash.

[73] Assignee: Calkins Manufacturing Company, Spokane, Wash.

[21] Appl. No.: 745,325

[22] Filed: Aug. 15, 1991

[51] Int. Cl.⁵ .............................................. A01B 49/00
[52] U.S. Cl. ................................... 172/311; 239/167; 280/491.1; 172/776
[58] Field of Search ............... 172/310, 311, 456, 457, 172/446, 776, 481; 239/159, 164, 166, 167; 280/656, 491.1

[56] References Cited

U.S. PATENT DOCUMENTS

| | | | |
|---|---|---|---|
| 3,654,999 | 4/1972 | Fischer | 172/456 |
| 4,042,044 | 8/1977 | Honnold | 172/311 |
| 4,117,892 | 10/1978 | Dietrich, Sr. et al. | 172/311 |
| 4,117,893 | 10/1978 | Kinzenbaw | 172/311 |
| 4,236,585 | 12/1980 | Adee et al. | 280/656 |
| 4,341,269 | 7/1982 | Hann | 172/311 |
| 4,739,930 | 4/1988 | Pask | 239/161 |
| 4,821,809 | 4/1989 | Summach et al. | 172/179 |
| 4,896,732 | 1/1990 | Stark | 172/456 |
| 4,944,355 | 7/1990 | Karchewski | 239/167 |
| 5,029,757 | 7/1991 | Bourgault et al. | 239/167 |
| 5,113,956 | 5/1992 | Friesen et al. | 172/456 |

FOREIGN PATENT DOCUMENTS 2110061  6/1983  United Kingdom ............... 172/311

Primary Examiner—Randolph A. Reese
Assistant Examiner—Spencer Warnick
Attorney, Agent, or Firm—Wells, St. John, Roberts, Gregory & Matkin

[57] ABSTRACT

A folding implement frame includes a central tongue frame and a pair of elongated boom frames mounted to the tongue frame for movement about first pivot axes. The boom frames are movable about the first pivot axes between towing positions extending behind the tongue frame in a narrow roadway travel configurations, and outward operative positions extending substantially laterally of the tongue frame. Rigid boom pull bars have outward ends pivotably mounted to the boom frames on second pivots and inward ends mounted to strut linkages. The strut linkages are mounted to the tongue frame for pivotal motion thereon about third pivot axes, and to the boom pull bars for pivotal motion thereon. The strut linkages also include provisions for enabling adjustment of the length of the strut linkage to enable pivotal motion of the boom pull bars and boom frames between the operative and towing positions. The strut linkages remain connected to the boom pull bars and tongue frame during such motion. Selectively operated castor wheel assemblies and operating controls are provided to enable selective motion of the boom frames to and from the towing and operative positions without requiring manual manipulation thereof.

10 Claims, 11 Drawing Sheets

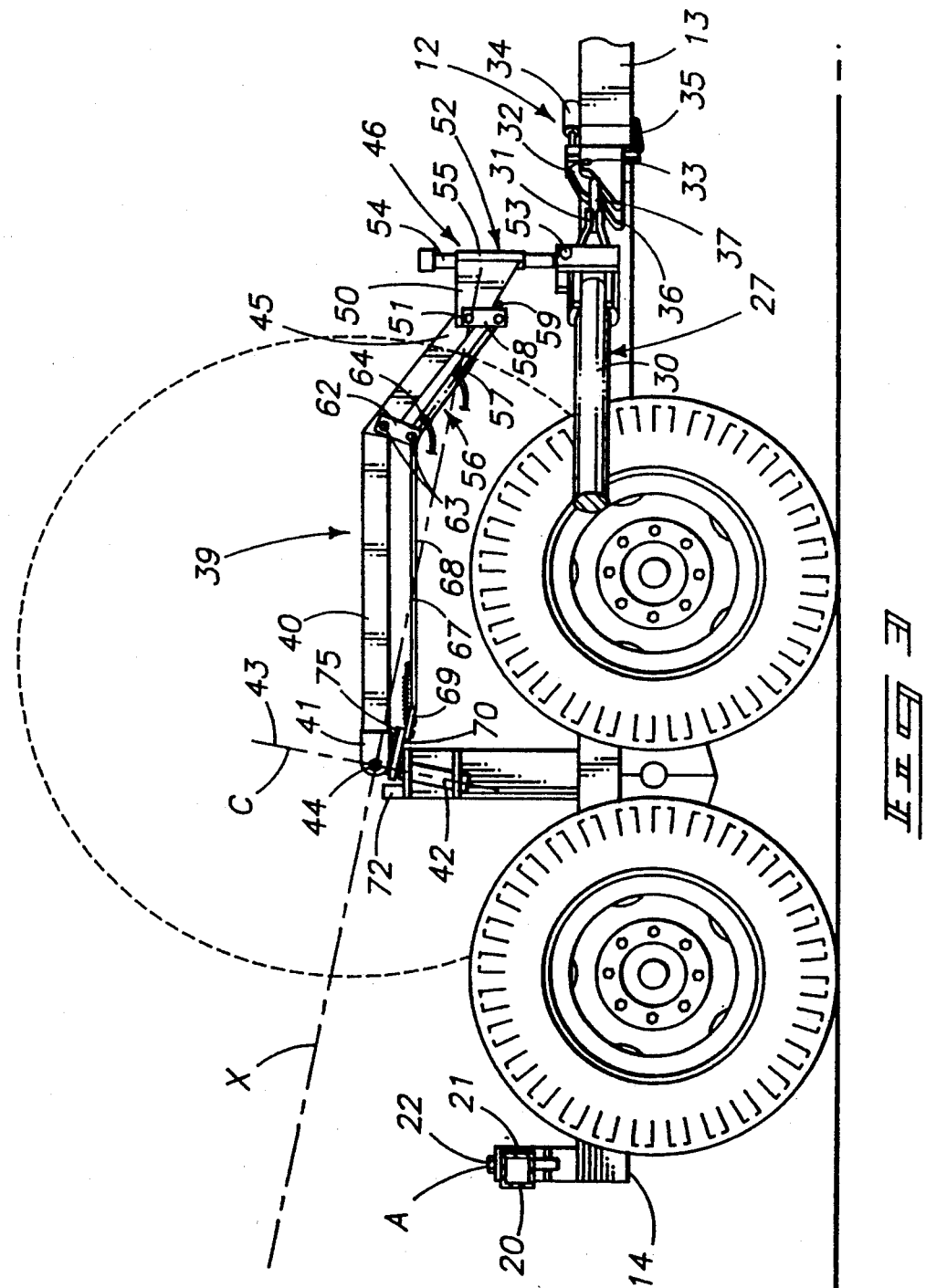

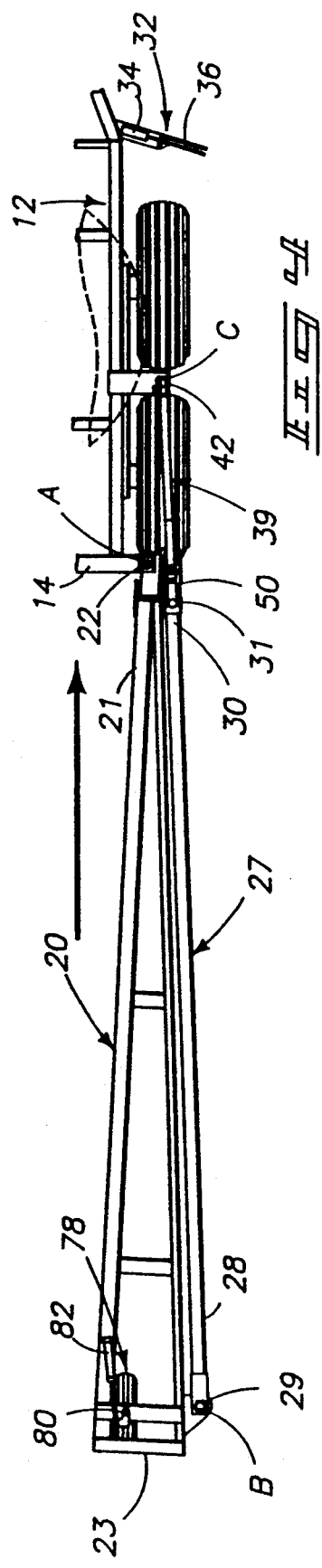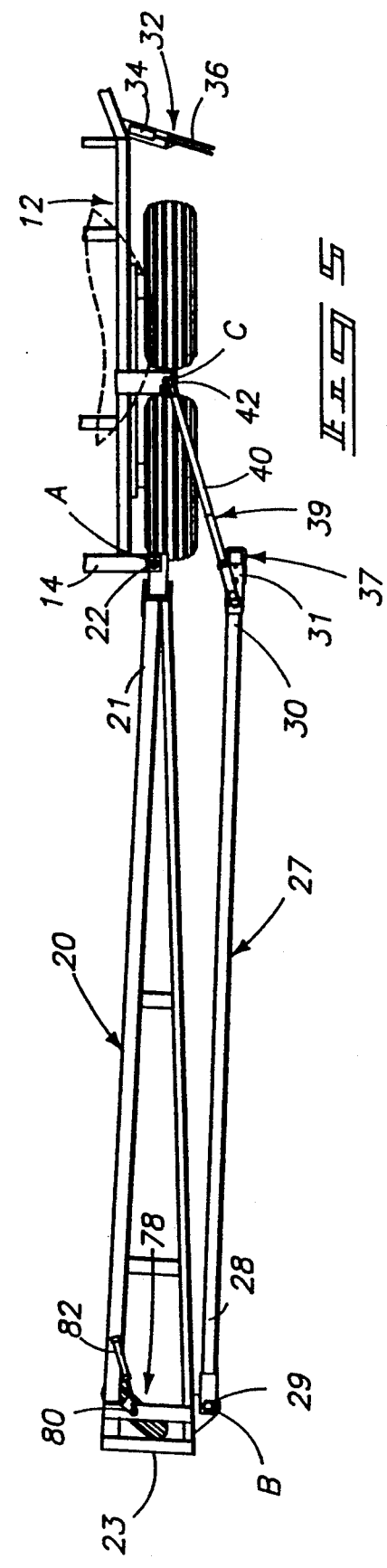

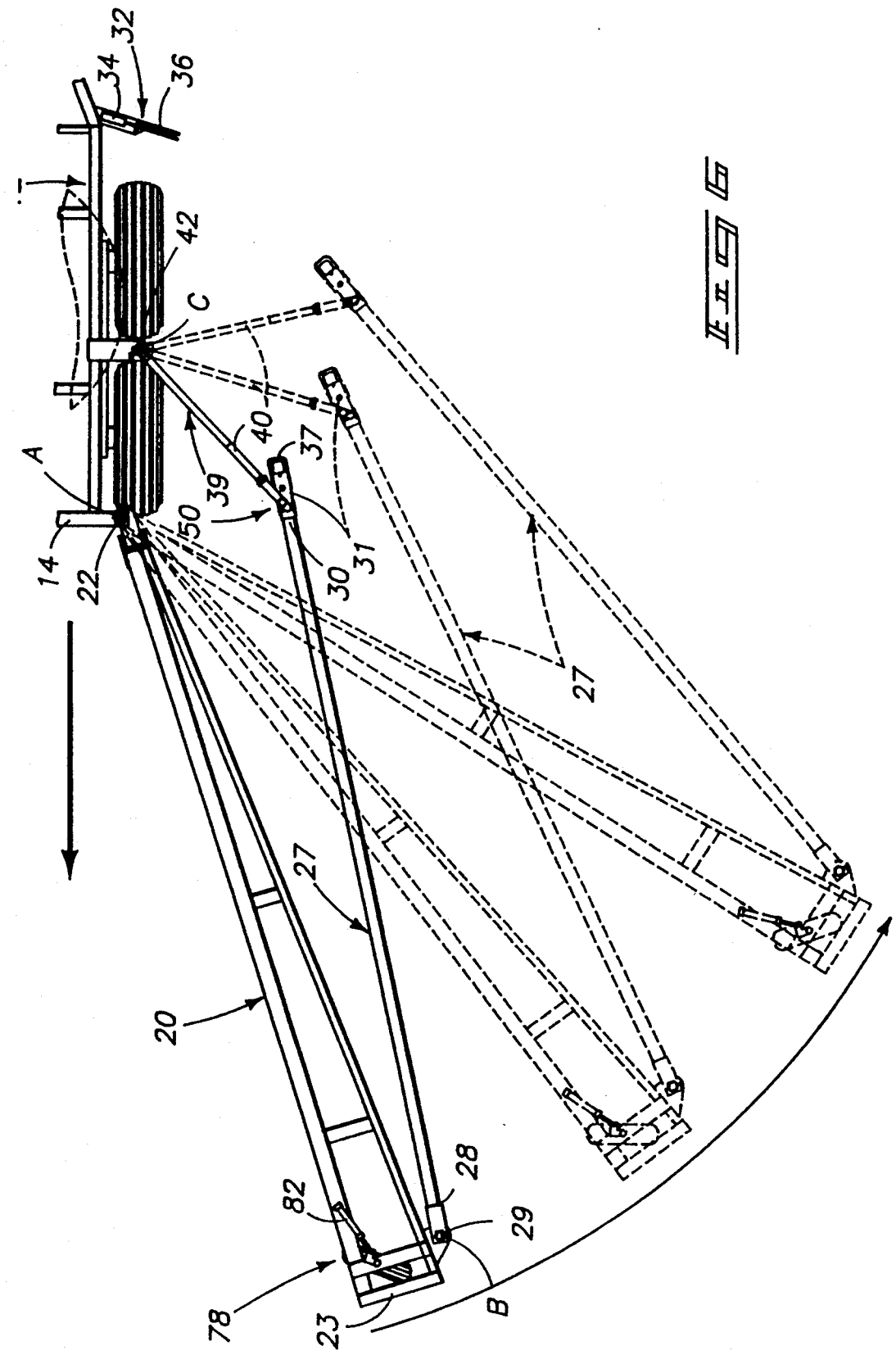

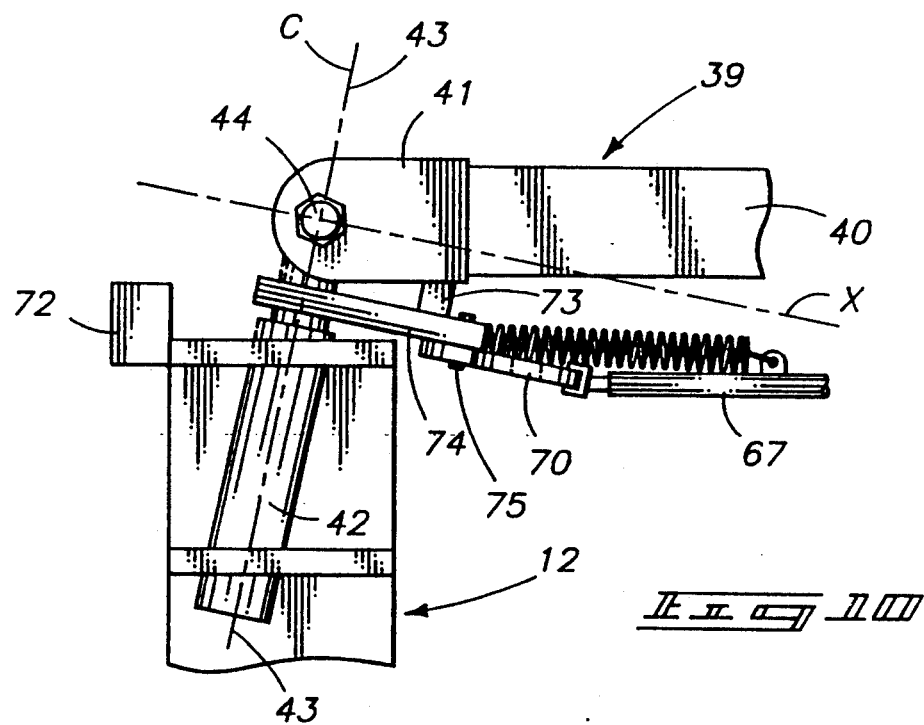
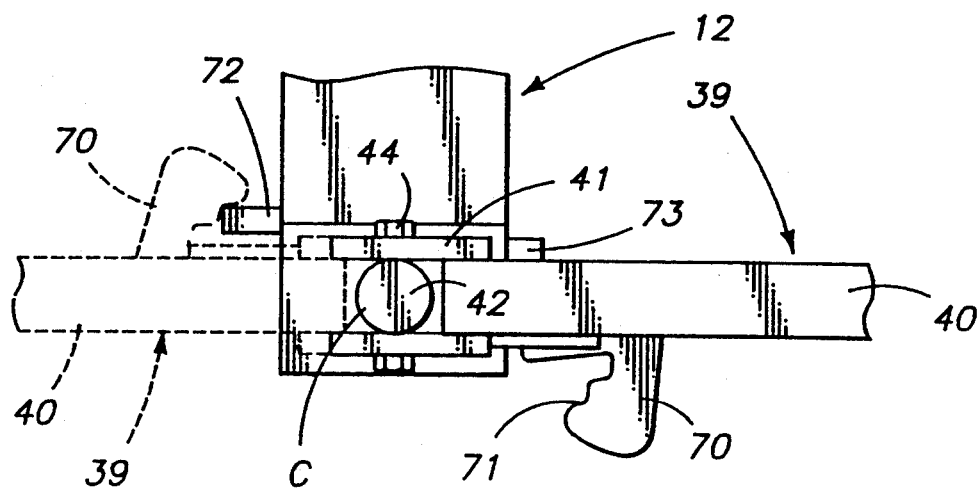

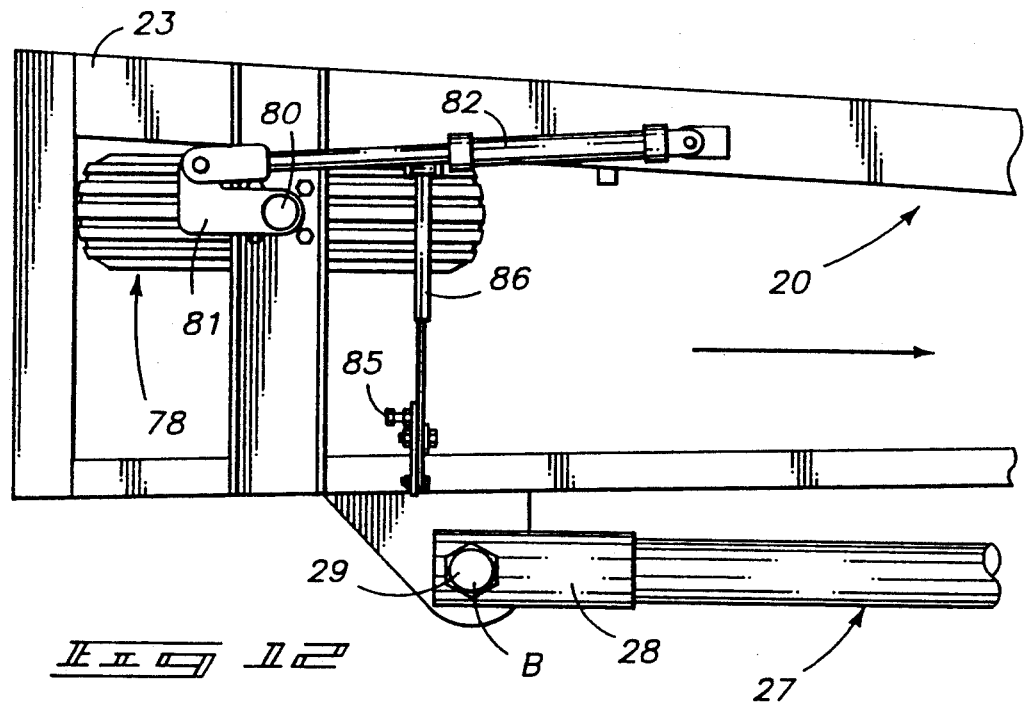
_FIG 12_
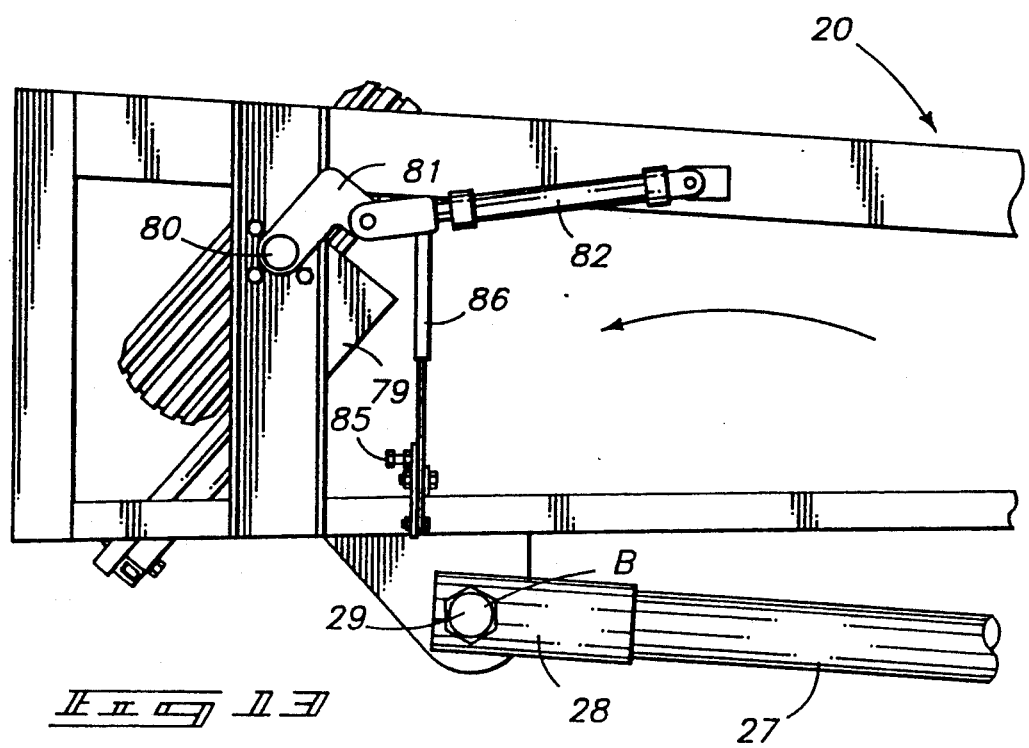
_FIG 13_

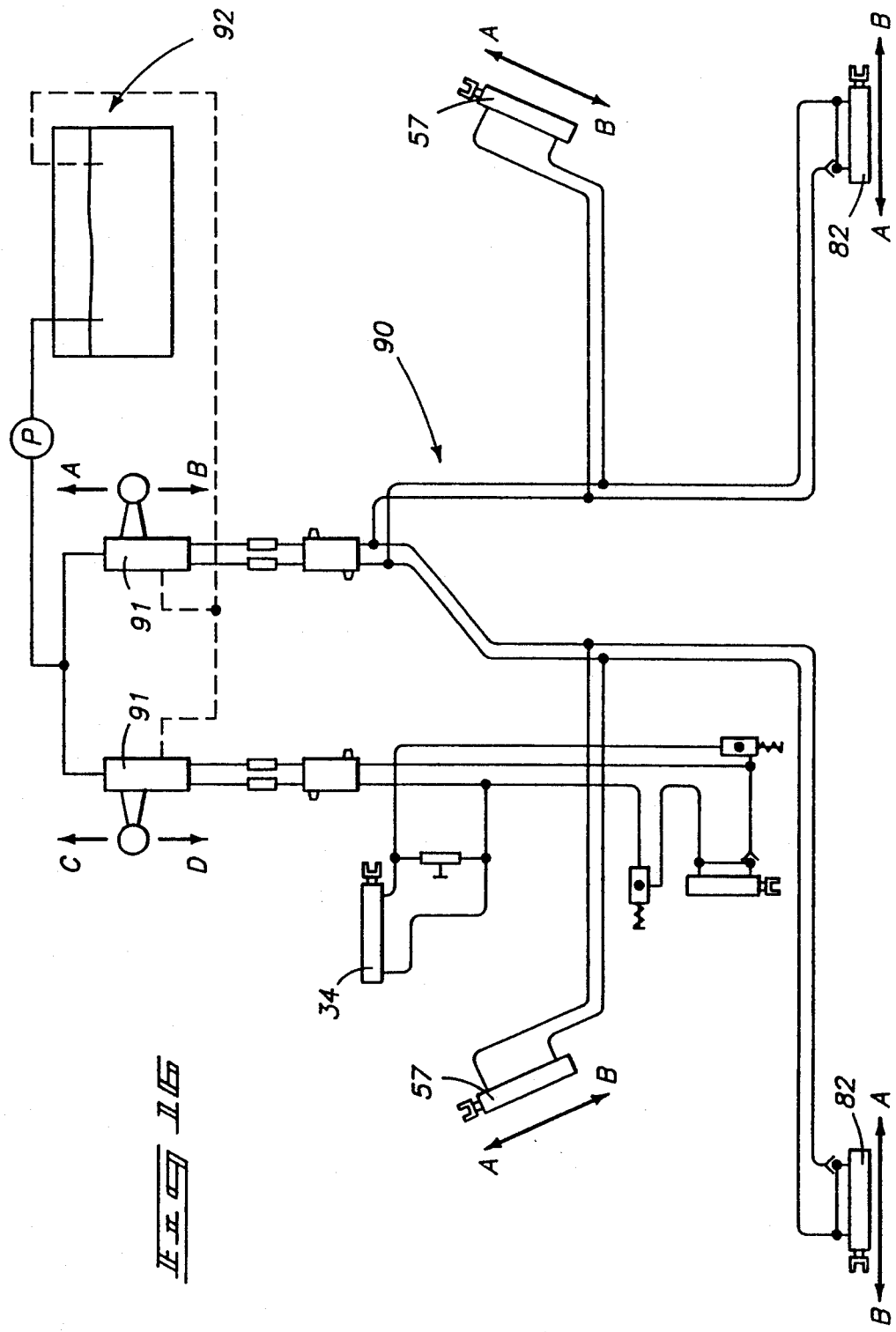

FOLDING IMPLEMENT FRAME

TECHNICAL FIELD

The present invention relates to an implement frame and folding of boom frames thereon from operative positions extending laterally of a central tongue frame and towing positions substantially aligned with the boom frames in narrow roadway transport configurations.

BACKGROUND OF THE INVENTION

Modern high horsepower tractors enable the use of wide swath implements. For example, field sprayers are presently being constructed with spray booms that will extend to more than 100 feet. Such frames, are designed to fold behind the towing vehicle in order to enable transport along roadways. This process typically involves a substantial amount of time and manual effort on the part of the operator.

U.S. Pat. No. 4,739,930 to Pask discloses an agricultural field sprayer that includes a folding boom frame. Opposed "wings" of the boom frame fold between field operative positions and rearwardly extending positions for roadway transport. A rigid pull bar or brace member connects the central tongue spray boom frames. In the operative field position the pull bar lends structural stability to the laterally outward extending boom sections. The pull bar, described as a "draw", is secured between the boom section, a tongue frame, and a fold arm. The fold arm is used to support the "draw" as the boom sections are pivoted from the operative, to the inoperative, transport condition. The fold arms themselves project laterally outward when the boom sections are pivoted back to their transport condition. In order to enable roadway transport, the fold arms must be disconnected from the "draws" and manually folded, along with the "draws" to a narrower transport condition. This process involves significant manual manipulation by the operator and, consequently, takes a considerable amount of time. The same is true for setting the apparatus up to be pivoted to its field condition.

U.S. Pat. No. 4,821,809 to Summach et. al. discloses a multiple section draw bar that, like the Pask patent above, folds between a laterally extending operative condition, and a rearwardly folded transport condition. This apparatus makes use of a flexible guy wire or "stay" that is secured between the tongue frame and outwardly extending boom sections in their operative conditions. To facilitate pivotal motion of the sections to their folded, transport conditions, the stays must be disconnected and stored.

Relatively rigid pull bar members interconnecting folding boom sections and a tongue frames are desirable to stabilize the long, outwardly extending boom sections. Still, a need has remained for a folding implement frame with a rigid pull bar that may be substantially automatically pivoted between outwardly extending operative and inwardly folded transport conditions.

BRIEF DESCRIPTION OF THE DRAWINGS

A preferred embodiment of the present invention is illustrated in the accompanying drawings in which:

FIG. 3 is a view similar to FIG. 2 only showing the components in an operative condition;

FIG. 4 is a view of a single boom frame and a portion of the tongue frame in the folded, transport condition;

FIG. 5 is a view illustrating initiation of the folding procedure by which the boom frame is automatically pivoted to its operative condition;

FIG. 6 is a view illustrating passage of the boom frame and associated elements toward the operative position;

FIG. 10 is a fragmented detail view of a pivot for the strut linkage of the present invention;

FIG. 11 is a top plan view of the elements shown in FIG. 10 with a folded position of the strut linkage shown in dashed lines;

FIG. 12 is a fragmentary enlarged top plan view of an outward end of the boom frame showing the orientation of a pivoted ground support wheel assembly in a transport orientation;

FIG. 13 is a view similar to FIG. 12 only showing the wheel assembly in a transition position where the boom frame is pivoted between the trailing and operative positions;

FIG. 16 is a simplified control schematic illustrating operational fluid drive and control for the present implement frame.

DETAILED DESCRIPTION OF THE PREFERRED EMBODIMENT

Figure 1:
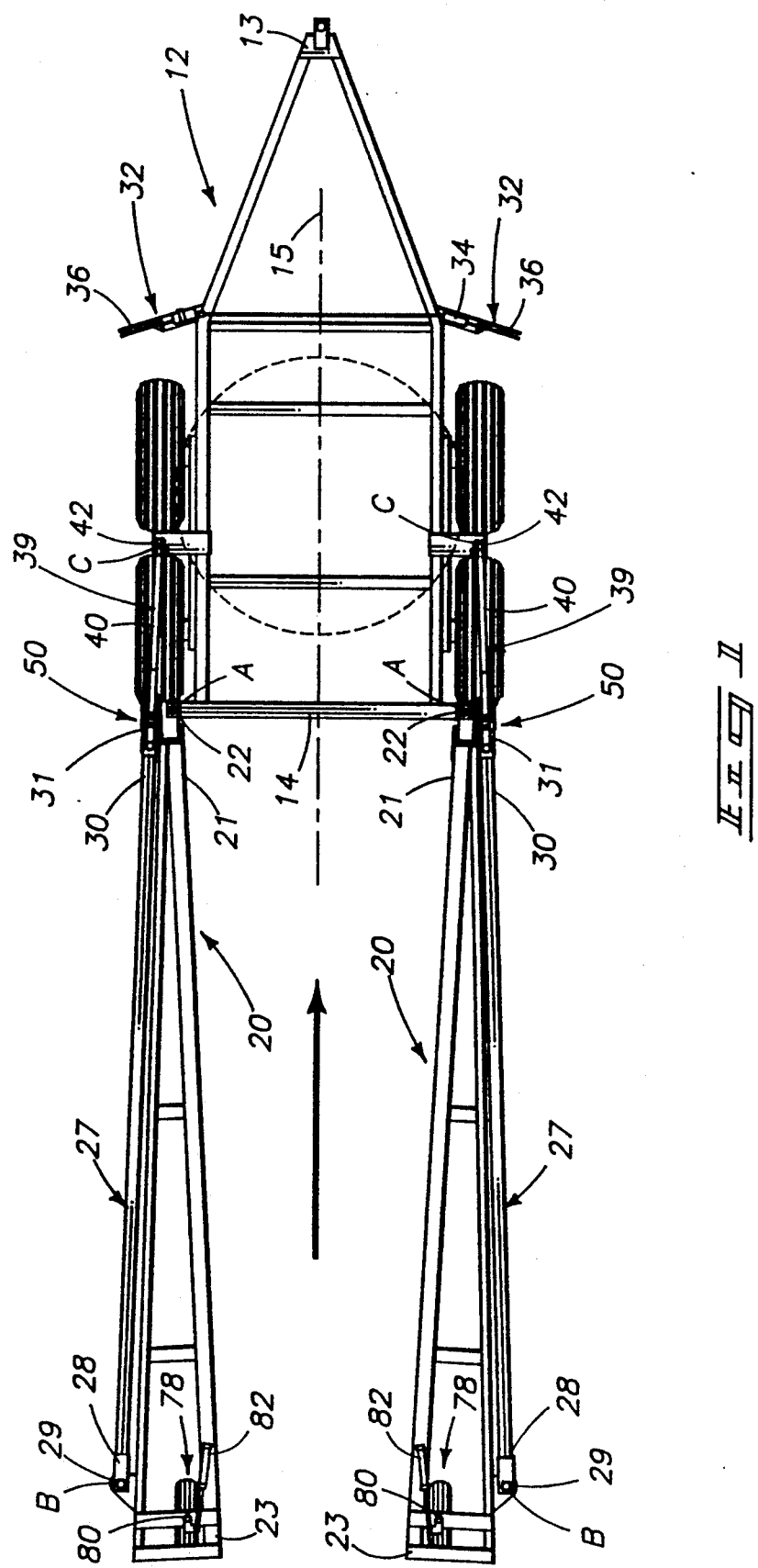
FIG. 1 is a top plan view of a folding implement frame incorporating features of the present invention.

This disclosure of the invention is submitted in furtherance of the constitutional purposes of the Patent Laws "to promote the progress of science and useful arts" (Article 1, Section 8).

A folding implement frame embodying principal features of the present invention is exemplified by the drawings and is designated therein by the reference character. The folding frame is shown substantially complete in FIG. 1. However, only a single folding side is shown in the remaining figures. It should be understood that the opposed sides are substantially mirror images and perform in substantially identical manners, with substantially identical elements.

It should also be understood that the present folding implement frame may be utilized with numerous forms of ground working tools, sprayers, or other apparatus. Spray booms (not shown) for example, may be mounted to the present implement frame and be pivoted thereon to shift between operative and inoperative positions in cooperation with the present implement frame and its capability to shift between towing and operative positions as described in detail below.

The present implement frame includes a central tongue frame 12. The tongue frame 12 is wheel supported and includes a forward end 13 adapted for attachment to a towing vehicle such as a tractor (not shown). The tongue frame 12 also extends toward a rearward end 14. A central reference line 15 shown in FIG. 1 extends through the tongue frame 12. An arrow, aligned with the central reference line 15 indicates a forward, longitudinal direction of travel for the implement frame.

Figure 7:
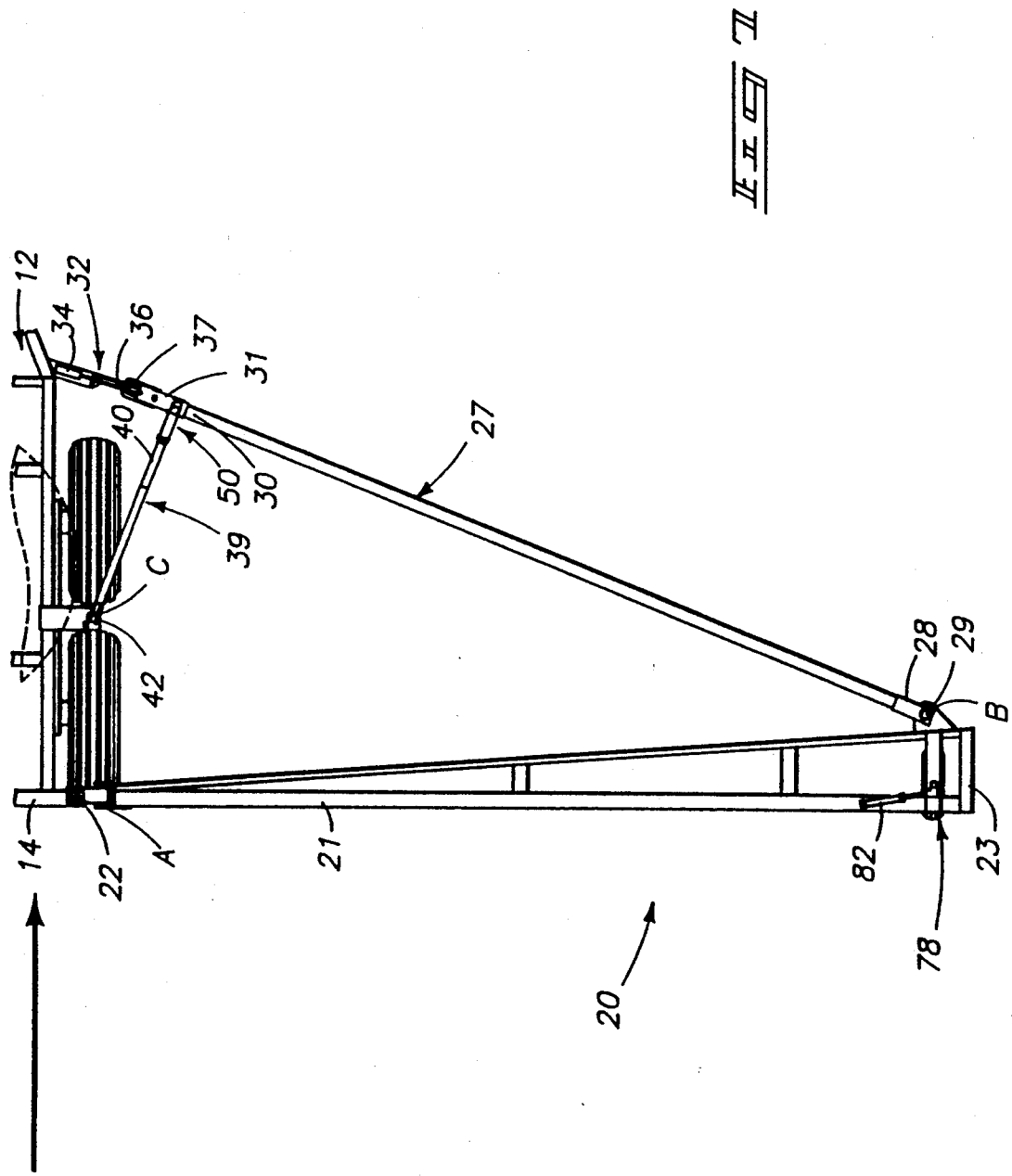
FIG. 7 is a view of the boom frame and associated elements in the laterally extending operative condition.

A pair of elongated boom frames 20 are pivotally mounted to the tongue frame for movement between the towing position shown in FIG. 1 and the operative position shown in FIG. 7. One of the boom frames 20 is shown in an outward, laterally extending operative position shown in FIG. 7.

An inward end 21 of each boom frame 20 is mounted to the tongue frame 12 by a first pivot assembly 22. The assembly 22 allows pivotal motion between the laterally extending operative condition and the rearwardly, narrow transport condition.

The inward end 21 is mounted by the first pivot assembly 22 about a substantially vertical first pivot axis A on the tongue frame. Slightly outward of the vertical first pivot axis A is a substantially horizontal pivot connection which enables the boom frame section to articulate as when the implement is moving over undulating terrain.

The boom frame 20 extends from pivot assembly 22 to an outward end 23. It is noted that it is entirely conceivable and probable that each boom frame 20 will mount a boom frame extension (not shown) that will extend on beyond the end section shown in the present drawings. Provision of such extensions will not effect the structure or operation of the present frame nor fall outside of the scope of the invention claimed herein.

A boom pull bar 27 is provided for each boom frame. Each pull bar 27 is connected at an outward end 28 to a boom frame 20 and is connectable at an inward end 30 to the tongue frame 12.

Each boom pull bar 27 is a rigid elongated bar and includes a ball joint 29 at the outward end 28 to facilitate articulation between the bar 27 and associated boom frame 20 about a second pivot B.

A fitting 31 on each of the pull bar inward ends 30 adapts the end 30 for connection to the tongue frame 12. Each fitting 31 is simply comprised of a loop or eye 37 receivable by a latch mechanism 32 (FIGS. 8, 9) on the tongue frame 12. The loop or eye 37 is rigid and is affixed to the inward boom pull bar end 30.

Figure 8:
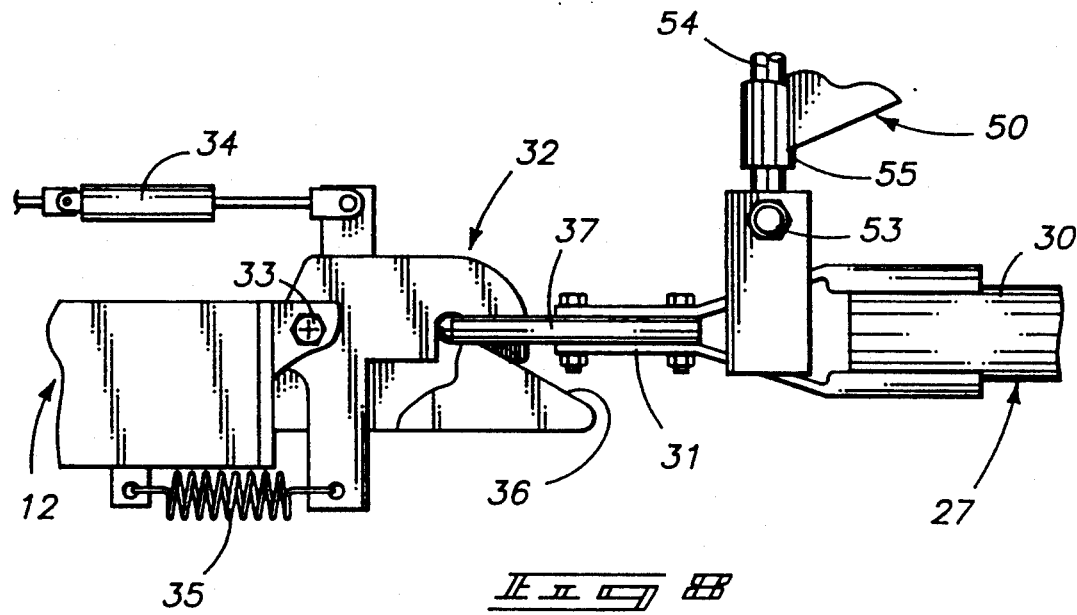
FIG. 8 is a view of a latch mechanism for connecting the pull bar to the tongue frame.
Figure 9:
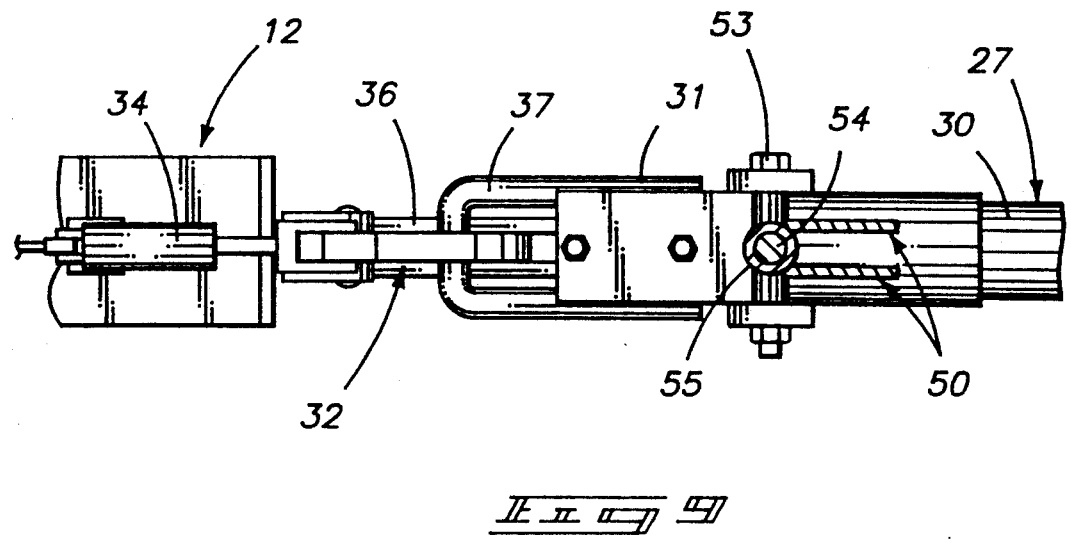
FIG. 9 is a top plan view of the elements shown in FIG. 8.

Each latch mechanism 32 is mounted by a pivot pin 33 and moves about the axis of the pin by actuation of a cylinder 34. The cylinder is mounted by a mechanical linkage across the frame 12 to a substantially identical latch on the other side of the frame, to operate both latches simultaneously. It may be selectively retracted to pivot the latches upwardly to disengage fittings 31, or downwardly to catch and secure the fittings 31, one of which is shown in FIG. 8.

Two return springs 35 are provided. One is situated opposite the cylinder 34 and interconnects a bottom side of the latch to the tongue frame 12. The other (not shown) connects the opposite latch to the frame. Springs 35 assist the latches in returning to the closed condition shown in FIG. 8.

A guide ramp 36 on each latch includes upwardly inclined guide surfaces for engaging and guiding the fitting 31 upwardly into the confines of the latch assembly. The ramp 36 surfaces are rigidly attached to the tongue frame 12.

The inward boom pull bar end 30 is shown secured to the tongue frame 12 in its operative condition in FIG. 7. Here, the fitting 31 is secured by the latch 32 in order to transmit tension along the length of the rigid boom pull bar 27 to the outward end of the boom frame 20.

The rigid pull bar, and the connections at inward end 30 and outward end 28, will also react under compression to stabilize and brace the associated outwardly extending boom frame 20 against any forward thrust about the first axis A. Forward "thrust" may occur when the implement frame is inadvertently moved in reverse, or when relatively steep inclines are experienced and the frame sections would otherwise tend to swing ahead of the tongue frame 12.

A strut linkage is illustrated at 39 for each boom frame 20, pivotably carrying the inward end 30 of the associated pull bar 27 for movement between the operative and towing positions. One of the two substantially identical preferred strut linkages is illustrated particularly in FIGS. 2 and 3.

The preferred strut linkage 39 is pivotably mounted to the tongue frame 12 at a first linkage end 41. Linkage 39 is mounted at a second end 45 to its associated pull bar 27. The first end 41 pivots about a third pivot axis C on the tongue frame 12. The second end 45 pivotably mounts the inward end of the boom pull bar 27.

The strut linkage 39 includes an elongated rigid arm 40. An inward end of the arm 40 comprises the first linkage end 41 and is mounted by a pivot 42 to the tongue frame 12. The pivot 42 defines the third pivot axis C, which is preferably fixed on the tongue frame 12 forward of the first pivot axis A of the boom frame 20.

Figure 2:
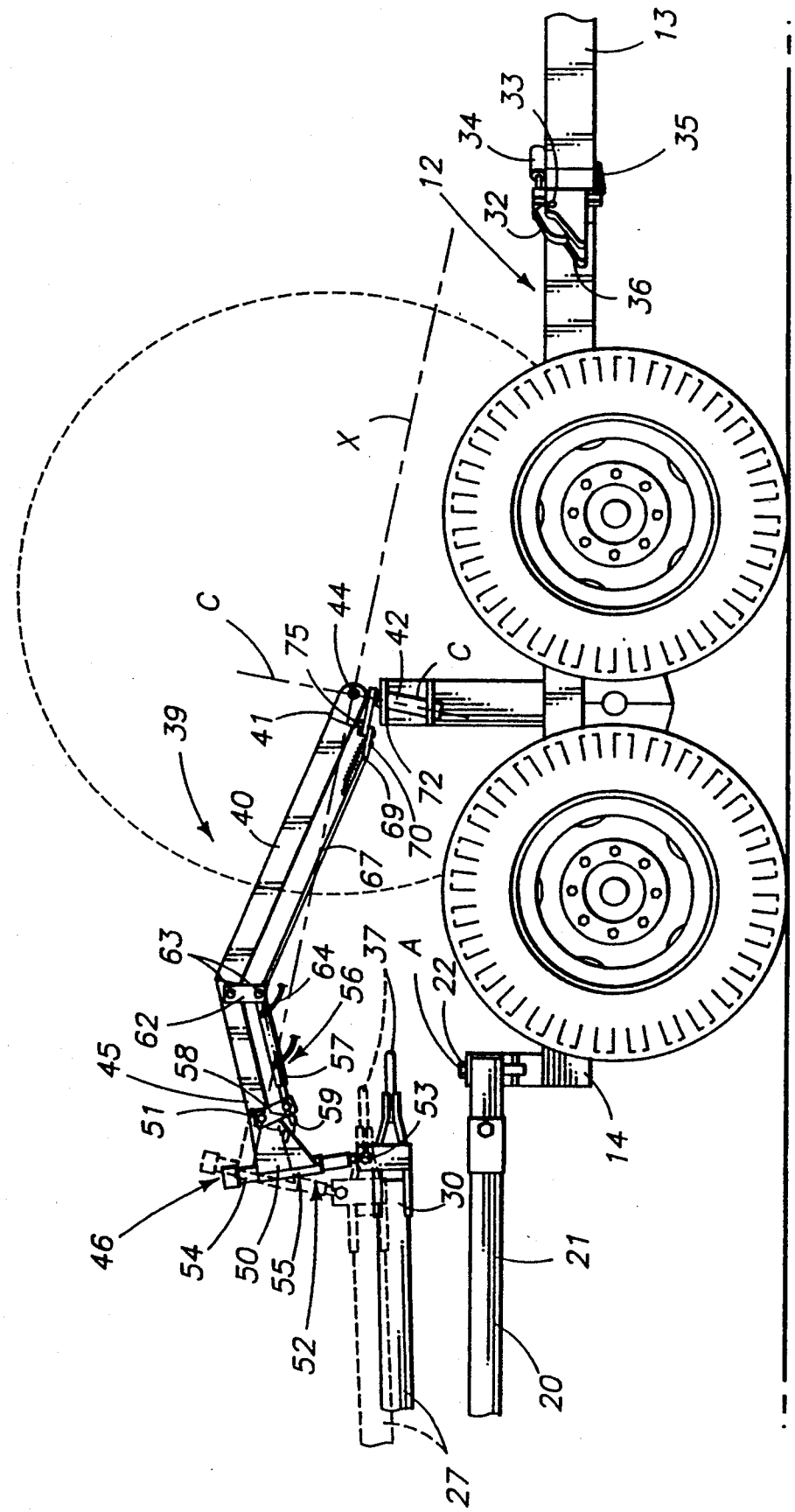
FIG. 2 is a fragmented enlarged side view of the tongue frame and portions of the pull bar, boom frame, and strut linkage.

As shown in FIGS. 2 and 3, the third pivot axis C is inclined such that the rigid arm 40 will move on an inclined plane X as the boom frame 20 is pivoted between the operative and towing positions. This is done to provide elevational clearance for the tongue frame wheels and to elevate the pull bar 27 to elevationally clear the boom frame 20 when the assembly is folded to the compact roadway towing position as shown in FIGS. 1 and 2.

A second end 45 of the rigid arm 40 is mounted by a portion of a lost motion link means 46 to the inward boom pull bar end 30. The lost motion link means 46 enables adjustment of the strut linkage length. By doing so, means 46 accommodates pivotal motion of the rigid boom pull bar 27 between the operative and towing positions. All this is done while the strut linkage 39 remains connected between the boom pull bar 27 and tongue frame 12 during such motion.

The lost motion link means 46 is also provided with an operator means for selectively shifting the strut linkage and boom pull bar. This enables automatic movement of the boom frame from the towing position to the outwardly extending operative position as shown in FIG. 5. Such movement is completed in response to rearward movement of the tongue frame 12 as shown in FIG. 6, caused by the towing vehicle (not shown).

Means 46 includes a link plate member 50. Plate member 50 includes a horizontal pivot connection 51 attaching the plate for motion about a substantial horizontal pivot axis to the outward or second end 45 of the rigid arm 40.

An upright slip pivot assembly 52 is provided at an opposite end of the plate 50. The slip pivot 52 is advantageously comprised of a shaft 54 pivotably mounted to the inward end of the pull bar 27, received within a slide tube 55 affixed to the plate 50. This arrangement facilitates pivotal motion about the axis of the shaft and vertical play between the pull bar 27 and the strut arm 40.

The lower end of the slip pivot shaft 54 is connected by a horizontal pivot 53 to the inward pull bar end 30.

Pivot 53 is substantially parallel to the pivot connection 51 while the slip pivot 52 is substantially transverse to both. These angularly offset pivot axes allow substantial pivotal "play" between the rigid arm end 45 and the inward pull bar end 30.

Figure 15:
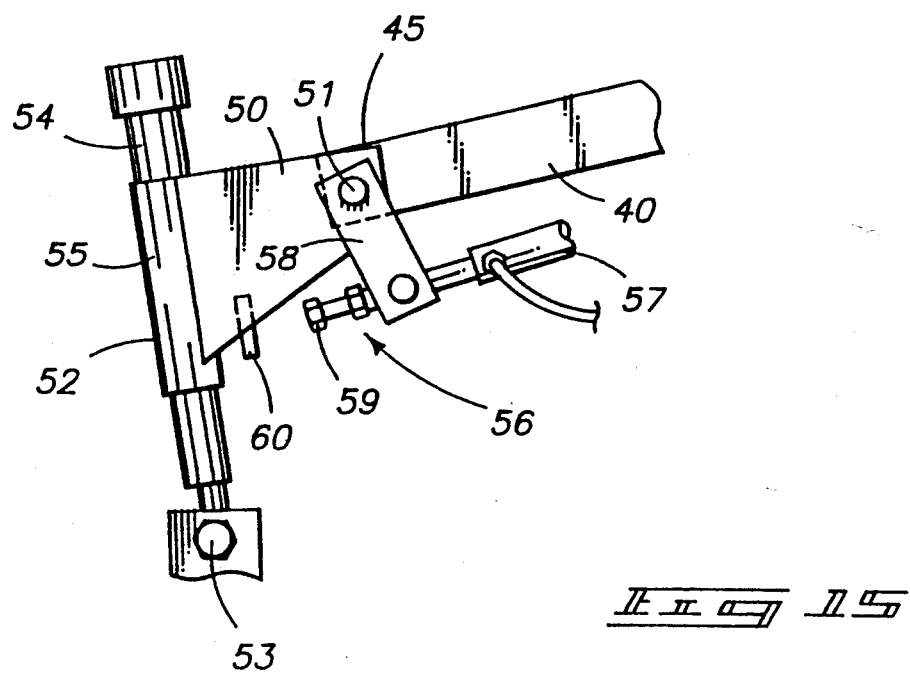
FIG. 15 is a fragmented detail view of a link plate member and lost motion link means.

Means is provided at 56 in FIGS. 2, 3, and 15 between the rigid arm 40 and link plate member 50 for selectively pivoting the link plate member about the horizontal pivot axis 51. The link plate member 50 is otherwise free to swing downwardly about pivot axis 51 under the weight of the boom pull bar 27 and its pivot connection at 53 to the link member.

Means 56 is provided to selectively pivot the link plate member 50 on the axis of pivot 51. This is done to alter the angular positions of the pull bar and strut linkage in relation to the central reference line 15 (FIG. 1). In doing so, means 56 functions as an operating means to initially shift the linkage 39 and the pull bar 27 to a starting orientation (FIG. 5) when the boom frame is to be moved from the towing position (FIG. 4) to the operative position (FIG. 7). The linkage also aligns fitting 31 to swing in a plane and on a radius to the latch 32 as the fitting moves to the operative position. This assures proper positioning of the loop or eye 37 to be received by the guide ramp 36.

Means 56 includes an extendible cylinder 57. One end of the cylinder 57 is carried by a link 58. Link 58 freely pivots on the horizontal pivot connection 51. Pivot link 58 mounts an adjustable stop bolt 59 that comes into abutment with a stop plate 60 on plate member 50 when the cylinder 57 is extended.

The opposite end of cylinder 57 is mounted to another pivot link 62 suspended from the arm 40 by spaced horizontal pivot pins 63. A partially extendible rod 67 is mounted between the pivot link 62 and a pivoted latch assembly 70 at the inward end of the strut linkage. A spring 69 biases the extendable rod 67 toward a normally retracted condition.

The latch assembly 70 is mounted to the pivot 42 (FIGS. 10, 11) and moves about the third pivot axis C with the strut linkage 39. Latch hook 70 includes a double notched hook configuration 71 that is operable to catch a stationary pivot stop 72 on the tongue frame 12.

The latch hook 70 will snap over the pivot stop 72 as the strut linkage moves to the folded, towing orientation. The latch assembly thus prevents the strut linkage 39 and the pull bar 27 from swinging outwardly from the towing position.

The pivot stop 72 also abuts the rigid arm 40 to prevent inward swinging motion of the rigid arm 40 and link plate member 50 beyond the towing position. The axis of the slip pivot 52 is thereby prevented from shifting inwardly beyond a dead center relation with the first and third pivot axes A and C.

Cylinder 57 is selectively extendible to pivot the latch hook 70 to an unlatched configuration in order to facilitate pivotal motion of the strut linkage toward the open, operative condition.

The folding implement frame also includes, in the preferred form, a pivoted ground supported wheel assembly 78 for each boom frame 20. The pivoted ground supported wheel assembly is situated adjacent the outward boom frame end 23.

Assembly 78 includes a castor frame 79 mounted to the boom frame by a castor pivot 80 as shown in FIGS. 12 and 13. The castor frame and associated wheel are selectively moved about the castor pivot 80 by means of a bell crank 81 and an appropriate wheel operating means such as a cylinder 82.

The wheel operating means is selectively controllable to pivot the wheel assembly about the axis of the castor pivot 80 between:

(a) a folding position (FIGS. 5, 13) with the wheel axis at an acute angle to the boom frame to facilitate guiding of the boom frame between towing and operative positions responsive to rearward motion of the tongue frame 12;

(b) a towing position (FIGS. 4, 12) wherein the wheel axis is substantially perpendicular to the boom frame and central reference line 15; and (c) an operative position (FIGS. 7, 14) wherein the wheel axis is substantially parallel to the boom frame and perpendicular to the central reference line 15, for guiding the boom frame in its operative position.

The cylinder 82 is connected at one end to the boom frame 20 and at the remaining end to the bell crank 81. Extension and retraction of the cylinder will therefore result in pivotal adjustment of the castor wheel to the positions corresponding to those described above and as shown in FIGS. 12-14 of the drawings. Selected positions of the wheel are also shown in FIGS. 4-7.

A pivoted stop 85 is mounted to the boom frame 20 adjacent the castor frame 79. The pivoted stop 85 is positioned to hold the wheel assembly in the operative position shown in FIG. 14. It will also pivot aside and thereby allow motion of the wheel assembly to the towing position shown in FIG. 12.

The pivoted stop 85 is shifted between a lower, operative position in the path of the castor frame 79, and an upwardly elevated position clear of the castor frame by means of an appropriate linkage. In the example shown, a cylinder or solenoid 86 is shown for this purpose. However, it is also contemplated that other actuators may be utilized, including any pivoted implement (not shown) that may be mounted to the boom frame.

FIG. 16 schematically exemplifies a hydraulic control system 90 used to operate the various cylinders described above. The control system makes use of standard, off the shelf valves, lines, and other flow controlling devices well known in the industry. A detailed description of the system 90 will therefor not be given herein. It is sufficient to note that the system 90 may be connected to the hydraulic system 92 of the towing vehicle (not shown). The system includes operator control valves 91, which may be easily situated within reach of the towing vehicle operator.

From the above description, operation of the invention may now be understood. Operation will be described beginning with the present implement frame in the FIG. 1 towing position. The description of operation will take the frame from the towing position of FIG. 1 to the fully extended, operative position shown in FIG. 7. Operation involving folding of the frame from the operative position to the towing position will then be given.

When the implement frame is situated in the towing position, the strut linkage 39 and pull bar 27 are oriented substantially in a compact roadway travel configuration. This position is shown in FIG. 1 in plan view and partially in FIG. 2 in elevation view. Here, the boom frame 20 extends directly behind the tongue frame 12. The wheel assembly 78 is pivoted so that the wheels facilitate forward motion of the boom behind the tongue frame as the unit is pulled along.

During this time, the boom frame 20, pull bar 27 and the link plate member 50 all pivot relatively freely to enable the implement frame to move or articulate elevationally and horizontally over hilly terrain and around corners.

In actual practice, the assembly has been subjected to sharp cornering with no adverse effects on the strut linkage due to the articulated nature of the link plate member 50 and its proximity to the pivot axes at the inward end of the boom frame 20. The strut linkage 39, however, is prevented from pivoting inwardly or laterally inwardly beyond a dead center position by provision of the stop 72 (FIG. 11).

The implement frame may be pulled down nearly any public roadway while in the transport position to a field where it is desired to open the opposed boom frames 20 to their laterally extending operative conditions. This process is accomplished in a simple and efficient manner by the operator from the cab of the associated towing vehicle.

To initiate this procedure, the operator firstly operates appropriate hydraulic controls 91 to cause actuation of the castor wheel cylinders 82, thereby shifting the castor wheels from the transport condition shown in FIG. 1 to the angled folding position shown in FIGS. 5 and 13. This cants the wheels and assists in motion of the boom frame from the towing position to the operative position.

After the cylinders 82 are operated to shift the wheels to the folding positions, the cylinders 57 are actuated to extend. This accomplishes two steps substantially simultaneously.

Firstly, the extending cylinders 57 cause the pivot links 62 and 58 to swing apart. The forwardly swinging pivot links 62 correspondingly force the estendable rods 67 forwardly, thereby pivoting the latches 70 rearwardly to disengage their respective stops 72. This will permit the strut linkages to now swing outwardly about the pivots 42.

At this time, the pivot links 58 swing rearwardly, moving the adjustable stop bolts 59 into engagement with the stop plates 60 of the link plate members 50. Continued extension of the cylinders 57 will lift the link plate members 50 upwardly, effectively increasing the length of the strut linkages 39 and pull bar assemblies 27.

The upwardly pivoting link members 50 force the pull bars 27 and the rigid arms 40 to swing up and outwardly to the position shown in FIG. 5. This "sets" the mechanisms for shifting of the boom frames from the transport to their operative positions, and positions fittings 31 to be aligned with latches 32.

To cause the boom frames to swing to the operative field positions, the operator, again from the seat in the pulling vehicle, simply backs the vehicle in an approximately straight line. The rearwardly moving towing vehicle will push the tongue frame 12 rearwardly.

The canted castor wheels and the "broken" linkage of the boom pull bars and strut linkages 39 will then assist movement of the boom frames 20 from the towing positions to the operative positions. Several successive positions of the boom frame, pull bar and strut linkage are shown in FIG. 6 as the tongue frame is moved rearwardly.

Finally, when the boom frames reach an orientation determined to be the outwardly extending operative positions (usually perpendicular to the central reference line 15), the inward boom pull bar ends 30 will automatically snap into position with the latches 32, thereby securing the boom pull bars 27 to the tongue frame in the orientation shown in FIG. 7.

If the fittings 31 do not properly align with the latch guide ramps, fine adjustment of the fitting 31 positions is easily accomplished using the adjustable stop bolts 59 on the link plate members 50. The bolts can be turned to selectively adjust the elevation of the loops 37 in relation to the plane "X".

Figure 14:
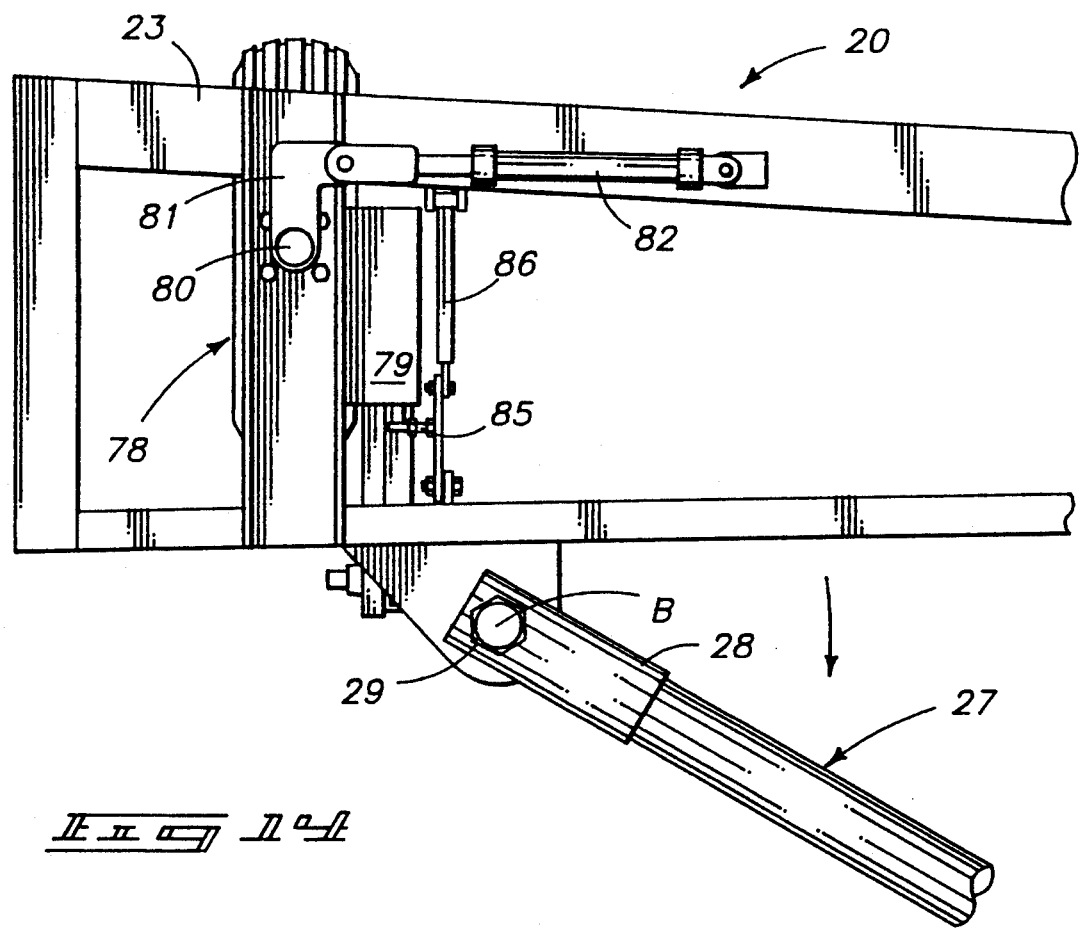
FIG. 14 is a view similar to FIG. 12 only showing the support wheel assembly in an operative position.

Once the boom frames reach the operative, field positions, the pivoted stops 85 are moved into position to stop the wheel assemblies 78 in their operative positions. Next, the castor cylinders 82 are actuated to shift the castor wheel assemblies to their operative positions, one of which is shown in FIG. 14. The implement frame is now open and ready for use.

It is emphasized at this point that the amount of rearward travel of the towing vehicle, in order to bring the trailing boom frames to the operative positions is minimal due to the orientation of the castor wheels.

In operation, the boom frames 20 are pulled at both ends by their inward connection to the tongue frame 12, and by the interconnection of the opposed ends of the boom pull bars between the outward ends of the boom frames and the tongue frame 12.

It is pointed out that the various pivot axes at the points of connection facilitate articulation of the boom frames 20 relative to the tongue frame 12 such that uneven terrain may be easily negotiated.

Operation of the implement frame may continue until it is desired to switch back to the towing position. This is easily accomplished by operation of a selective control 91 (again without requiring the operator to leave the towing vehicle) by which the latch pivot cylinder 34 is actuated to open the latches 32 and release the inward boom pull bar ends 30.

At this time, the pivoted stops 85 are repositioned to allow the wheel leg assemblies 78 to castor freely and the castor frame cylinders 82 are again actuated to shift the castor wheels to the towing position as shown in FIG. 12.

The cylinders 57 are actuated to retract to enable movement of the boom pull bars and strut linkages 39 to the towing positions without requiring manual effort by the operator. The retracted cylinders 57 accomplish two functions.

Firstly, the retracting cylinders 57 cause the extendable rods 67 to telescope together, thereby spring loading the latches 70 so they will snap over their respective stops 72 upon reaching the towing position.

Also at this time, the pivot links 58 move the adjustable stop bolts 59 away from engagement with the stop plates 60 of the link plate members 50 substantially as shown in FIG. 15. The plate members are now free to articulate about the axes of pivots 51 and 53, to accommodate the different swing arcs of the rigid arms 40 and the boom pull bars 27 as they move back to the towing positions. This condition is maintained to enable similar articulation during transport.

The operator may shift the present folding frame to the towing position (FIG. 1), after operating a selective control 91 to "set" the castor wheels in the towing positions. This is done simply by driving the vehicle forward. The forwardly moving vehicle pulls the tongue frame 12 forwardly and allows the castor wheel assemblies to guide the boom frames 20 and attached mechanisms to the transport positions. The boom frames will swing rearwardly to their towing positions. As this happens, the strut linkages 39 and boom pull bars 27 swing automatically to the towing position.

As the strut linkage approaches the position shown by dashed lines in FIG. 11, the latch hook 70 snaps over the stop 72 to prevent the rigid arm 40 and boom pull bar 27 from swinging back outwardly during transit. The stop 72 also functions to prevent the linkage 39 from swinging too far inwardly.

All this is accomplished without requiring that the vehicle operator to do any manual manipulation other than operating the conventional controls 91. The apparatus is now ready for transport.

It is noted that in the transport position all of the elements including the boom frames, the pull bars 27, and the strut linkages 39 are all confined within a narrow lateral space. This facilitates a width dimension of the entire unit that is safe and typically legal for common roadway travel. Yet enough articulation is allowed by way of the various pivot connections described above to enable transport over substantially any contour.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims appropriately interpreted in accordance with the doctrine of equivalents.

I claim:

1. A folding implement frame, comprising:
   a tongue frame having a forward end and a rearward end arranged along a longitudinal central reference line;
   an elongated boom frame having an inward end mounted to the tongue frame for movement about a first pivot axis, and an outward end remote from the tongue frame;
   a boom pull bar having an outward end pivotably mounted to the boom frame on a second pivot and an inward end adapted to be connected to the tongue frame;
   a strut linkage having a first end mounted to the tongue frame for pivotal motion thereon about a third pivot axis, and a second end mounted to the boom pull bar for pivotal motion thereon;
   wherein the boom frame is movable about the first pivot axis, and the boom pull bar and strut linkage pivot with the boom frame between a narrow roadway towing position in which the boom frame, the boom pull bar and the strut linkage are all substantially parallel to the central longitudinal reference line, and an outward operative position in which the boom frame is extending substantially laterally in relation to the central reference line; and
   wherein the strut linkage means includes a lost motion link means for enabling adjustment of the length of the strut linkage to accommodate pivotal motion of the boom pull bar with the boom frame about the first axis between the operative and towing positions with the strut linkage remaining connected to the boom pull bar and tongue frame during such motion.

2. A folding implement frame as claimed in claim 1 wherein the strut linkage includes an elongated rigid arm extending from the third pivot axis to the second end of the strut linkage;
   wherein the lost motion link means includes a link member mounted between the boom pull bar and the second end of the strut linkage, the link member including pivot connections formed on angularly offset axes pivotably joining the rigid arm and the boom pull bar; and
   means mounted between the rigid arm and link member for selectively pivoting the link member.

3. A folding implement frame as claimed in claim 1 further comprising strut linkage operating means for enabling shifting of the boom frame, boom pull bar, and strut linkage between the operative position and the towing position responsive to forward and rearward motion of the tongue frame.

4. A folding implement frame as claimed in claim 1 wherein the third pivot axis is substantially upright and the strut linkage includes an elongated rigid arm extending from the third pivot axis to the second end of the strut linkage;
   wherein the lost motion link means includes a link member mounted between the boom pull bar and the second end of the strut linkage, the link member including pivot connections formed on angularly offset axes including a substantially horizontal link member and a substantially vertical link member axis which join the rigid arm and the boom pull bar;
   means for selectively moving the link member about the substantially horizontal link member axis.

5. A folding implement frame as claimed in claim 1 wherein the boom frame includes a pivoted ground support wheel assembly adjacent the outward boom frame end; and wheel operating means for selectively pivoting the wheel assembly about a substantially vertical castor axis between (a) a folding position with the wheel axis at an acute angle to the boom frame, for guiding the boom frame between the operative and transport conditions; (b) a towing position with the wheel axis substantially perpendicular to the boom frame, for guiding the boom frame in the towing position; and (c) an operative position with the wheel axis substantially parallel to the boom frame, for guiding the boom frame in the operative position; and
   means for selectively pivoting the wheel assembly.

6. A folding implement frame as claimed in claim 1 wherein the boom pull bar outward end is pivotably mounted by a ball joint to the boom frame.

7. A folding implement frame as claimed in claim 1 wherein the boom pull bar outward end is pivotably mounted by a ball joint at the second axis to the boom frame, and wherein the inward end is mounted to the strut linkage.

8. A folding implement frame as claimed in claim 1 wherein the boom pull bar outward end is pivotably mounted by a ball joint to the boom frame, and wherein the strut linkage first end is mounted to the tongue frame for pivotal motion about an inclined axis such that the strut linkage pivots in an inclined plane.

9. A folding implement frame as claimed in claim 1 wherein the boom pull bar outward end is pivotably mounted by a ball joint on the second axis to the boom frame;
   wherein the third pivot axis is inclined such that the strut linkage pivots in an inclined plane;

wherein the strut linkage includes an elongated rigid arm extending from the third pivot axis to the second end of the strut linkage;

wherein the lost motion link means includes a link member mounted between the boom pull bar and the rigid arm, the link member including pivot connections formed on angularly offset axes joining the rigid arm and the boom pull bar such that the combined length of the strut linkage and boom pull bar is adjustable.

10. A folding implement frame as claimed in claim 1 wherein the lost motion link means includes a link member mounted between the boom pull bar and the second end of the strut linkage, the link member including pivot connections formed on angularly offset axes joining the strut linkage and the boom pull bar such that the combined length of the strut linkage and boom pull bar is adjustable.

* * * * *